United States Patent
Mamizuka et al.

(10) Patent No.: US 7,618,017 B2
(45) Date of Patent: Nov. 17, 2009

(54) ANGLE ADJUSTMENT APPARATUS FOR ELECTRONIC DEVICE

(75) Inventors: Satoki Mamizuka, Kawasaki (JP); William Anthony Magri, Shelton, CT (US)

(73) Assignee: NEC Inforntia Corporation, Kanagawa (JP)

( * ) Notice: Subject to any disclaimer, the term of this patent is extended or adjusted under 35 U.S.C. 154(b) by 526 days.

(21) Appl. No.: 11/397,623

(22) Filed: Apr. 5, 2006

(65) Prior Publication Data
US 2007/0235626 A1    Oct. 11, 2007

(51) Int. Cl.
*F16M 7/00*    (2006.01)
(52) U.S. Cl. ............... 248/677; 248/127; 248/923; 248/917; 235/383
(58) Field of Classification Search .......... 379/445; 248/377, 923, 127, 917, 454
See application file for complete search history.

(56) References Cited
U.S. PATENT DOCUMENTS
2004/0202315 A1* 10/2004 Toh ..................... 379/445
2005/0001114 A1* 1/2005 Ogawa .................. 248/127
2006/0113382 A1* 6/2006 Singgih et al. ............ 235/383

FOREIGN PATENT DOCUMENTS
JP      2004-266087       9/2004

* cited by examiner

*Primary Examiner*—Charles N Appiah
*Assistant Examiner*—Michael T Vu
(74) *Attorney, Agent, or Firm*—Sughrue Mion, PLLC

(57) ABSTRACT

An angle adjustment apparatus for an electronic device according to the present invention can be inexpensively formed by a compact and simple structure and readily assembled and disassembled. When a telephone set as an electronic device is in a small inclination position, auxiliary plates are substantially in parallel to supports of a leg. Tips of the auxiliary plates are brought into abutment against right surfaces of the first projections. Click portions of the supports are brought into abutment against left surfaces of the second projections. Accordingly, the supports cannot be further rotated counterclockwise with respect to the base. When the telephone set is in a large inclination position, the auxiliary plates are perpendicular to the supports. The tips of the auxiliary plates are brought into abutment against the engagement portions of the base. The click portions of the supports are located between the first projections and the second projections. Accordingly, the supports cannot be further rotated counterclockwise with respect to the base.

6 Claims, 8 Drawing Sheets

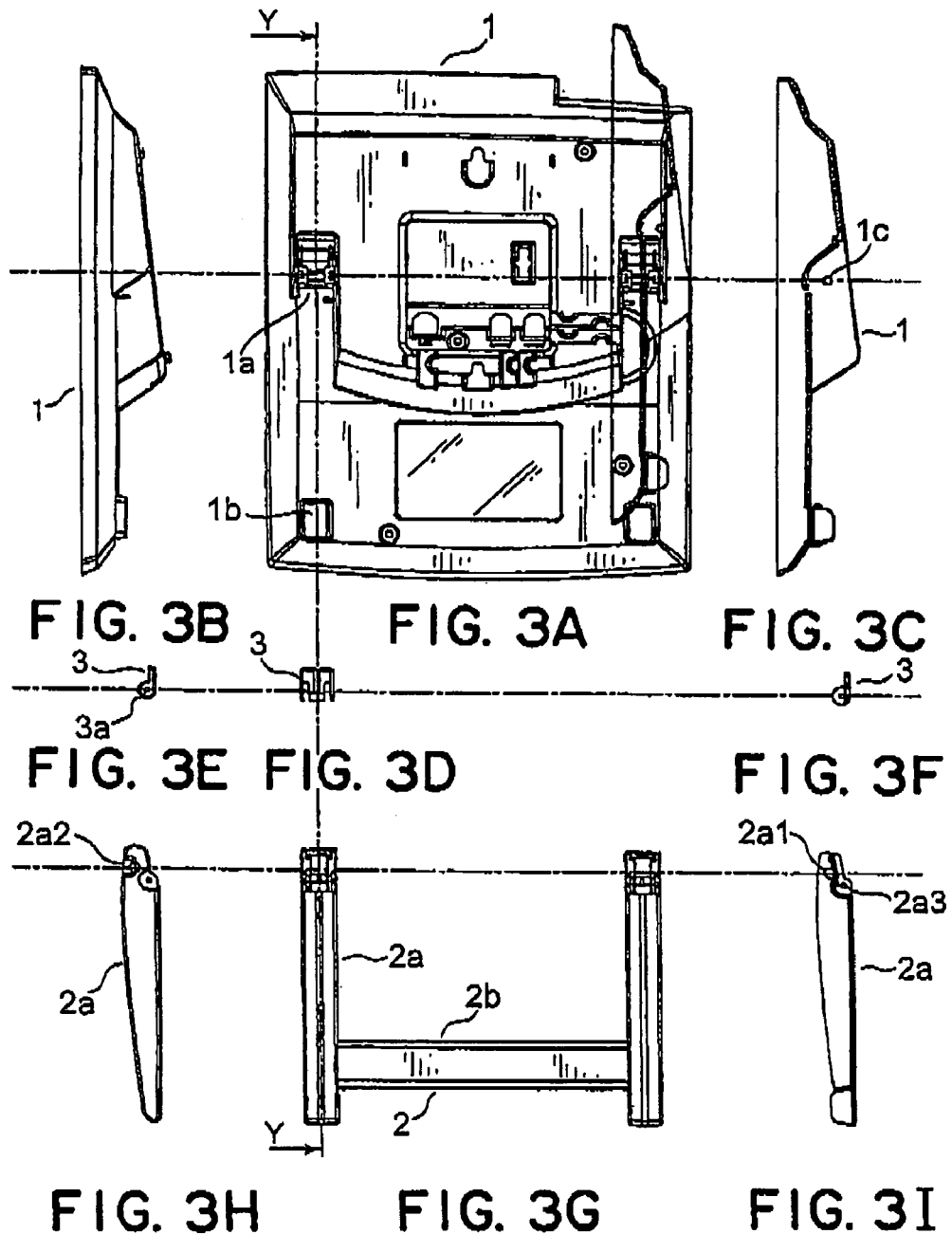

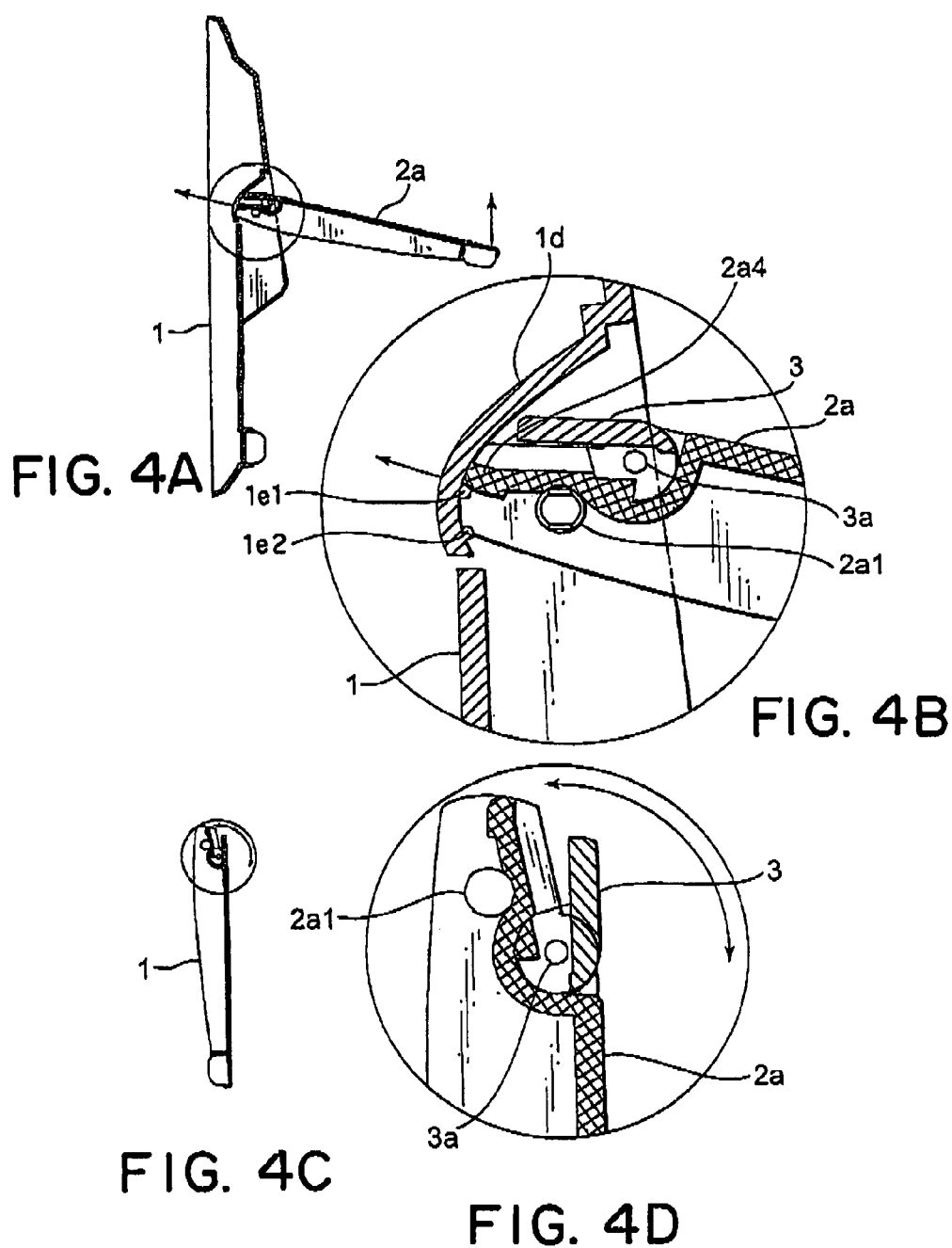

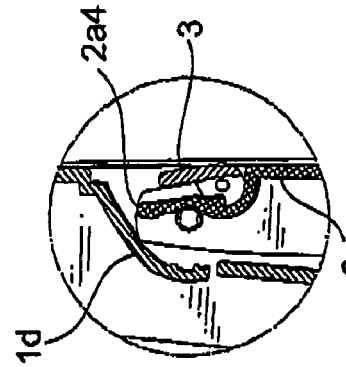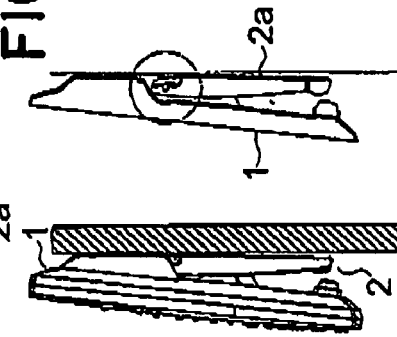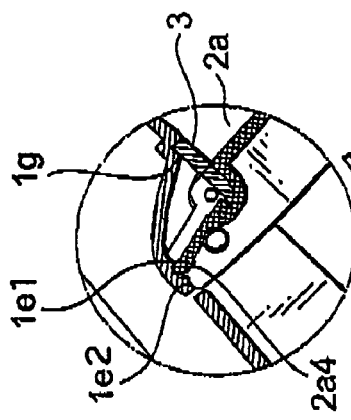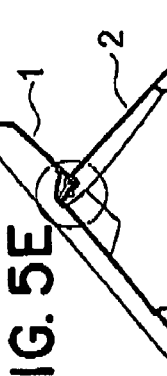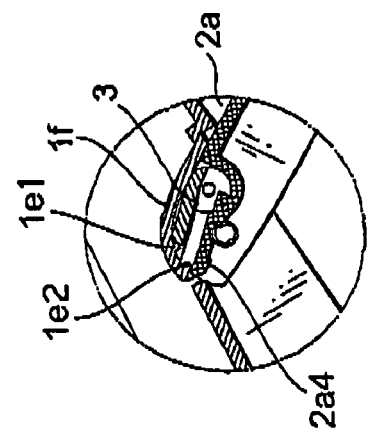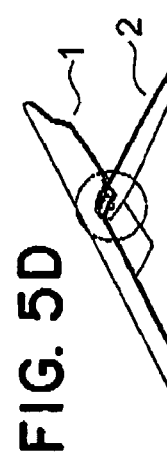

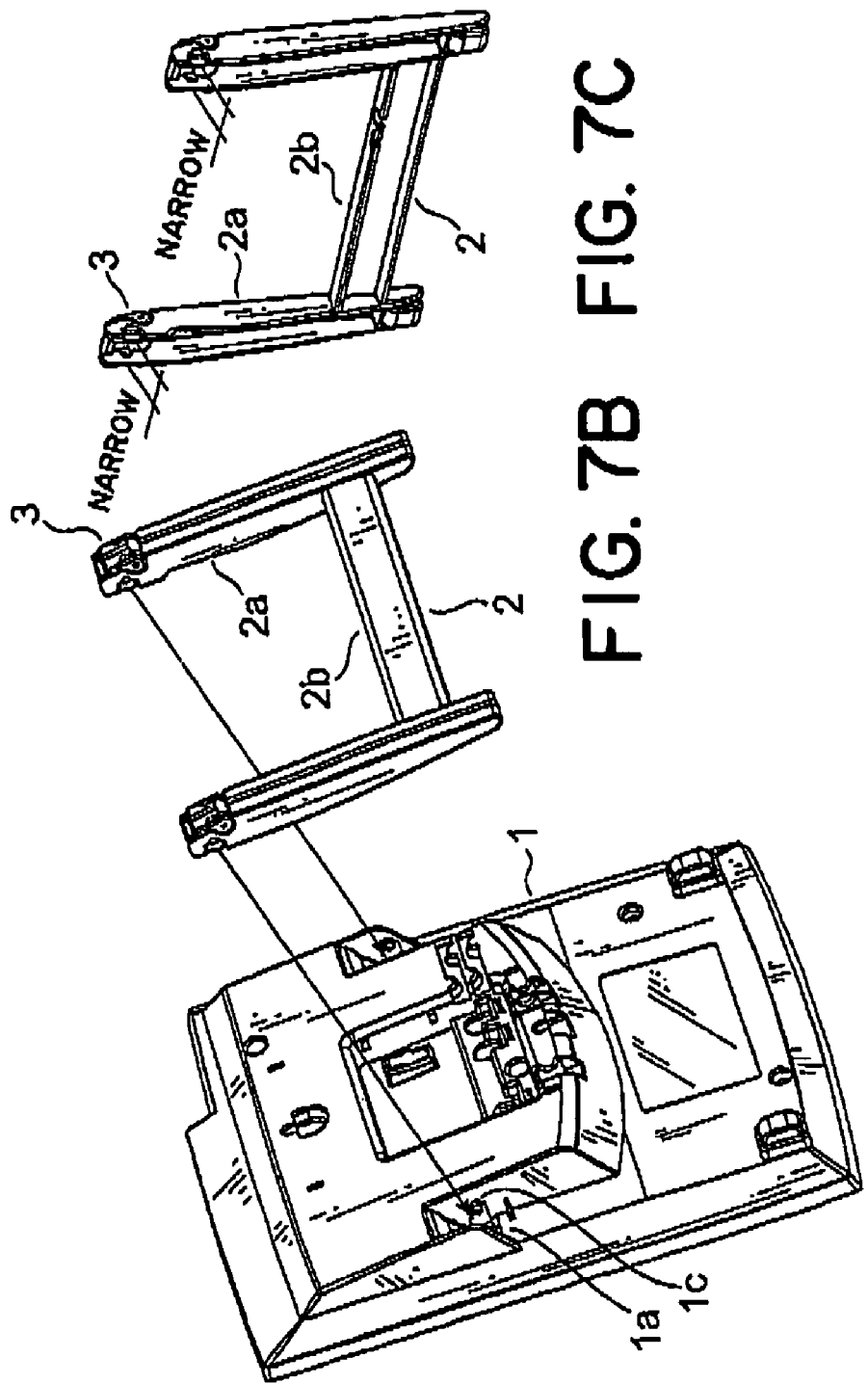

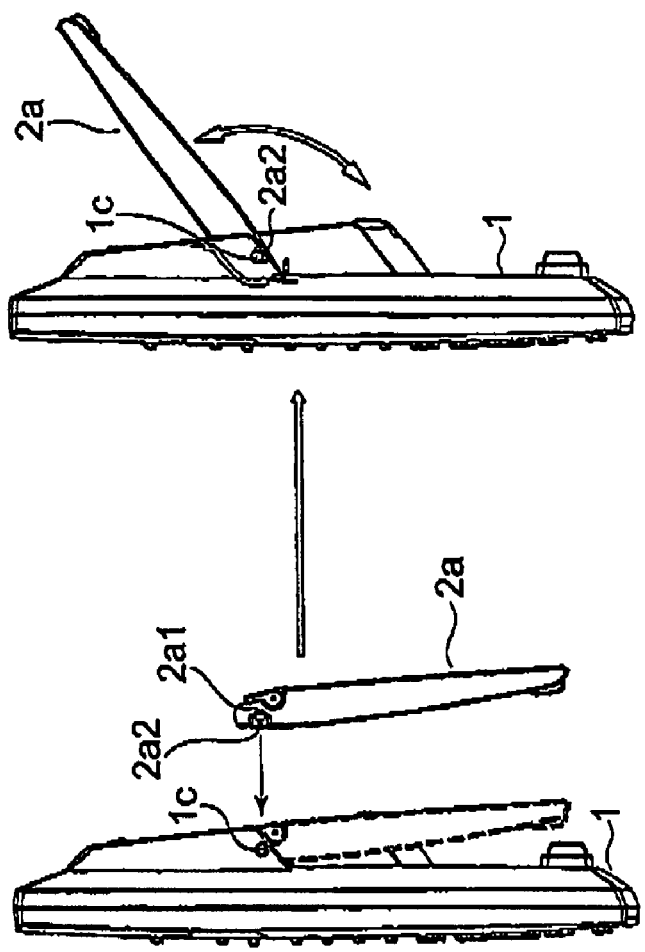

ANGLE ADJUSTMENT APPARATUS FOR ELECTRONIC DEVICE

BACKGROUND OF THE INVENTION

1. Field of the Invention

The present invention relates to an angle adjustment apparatus for an electronic device such as a telephone set, a television set, or an electronic calculator. More particularly, the present invention relates to technology to allow an electronic device to be held selectively in a small inclination position, a large inclination position, or a wall-hung position (upright position).

2. Description of the Related Art

For example, an example of a conventional angle setting structure for an electronic device is disclosed by Japanese laid-open patent publication No. 2004-266087, which was published and distributed prior to the filing of the present application. Such a conventional angle setting structure for an electronic device will be described below.

FIGS. 1A through 2B shows a conventional telephone set 31. FIG. 1A is a side view showing the telephone set 31 in a wall-hung position, and FIG. 1B is a plan view of the telephone set 31 shown in FIG. 1A. FIG. 2A is a side view showing the telephone set 31 inclined at a small angle on a desk, and FIG. 2B is a side view showing the telephone set 31 inclined at a large angle on the desk. Each of FIGS. 1A, 2A, and 2B partially includes a cross-sectional view.

As shown in FIGS. 1A and 1B, the telephone set 31 has a frame case including an upper case 32 and a lower case 33. Both of the upper case 32 and the lower case 33 are made of plastic. The telephone set 31 also has a display unit 34 attached near an end of the lower case 33 in a direction D. The display unit 34 has an angle-adjustable display surface. The telephone set 31 includes a handset 35 disposed on the upper case 32, a number of functional buttons 36, and a plurality of dial buttons 37.

The lower case 33 has a pair of rubber members 40 and 40 provided on a bottom 33a of the lower case 33 at an end of the lower case 33 in a direction C. The rubber members 40 are located on both sides of the lower case 33 in a direction A-B.

The telephone set 31 has a pair of first protrusions 41 and 41 arranged in parallel along the direction A-B on the bottom 33a of the lower case 33. Each of the first protrusions 41 is in the form of a flat box. The first protrusions 41 are located near the end of the bottom 33a in the direction C and formed integrally with the bottom 33a of the lower case 33. Each of the first protrusions 41 has a flat bottom 41a and a projection 42 formed integrally with the flat bottom 41a.

The telephone set 31 has a pair of second protrusions 43 and 43 arranged in parallel along the direction A-B on the bottom 33a of the lower case 33. Each of the second protrusions 43 is in the form of a flat box having the same height as the first protrusions 41. The second protrusions 43 are located near an end of the bottom 33a in the direction D and formed integrally with the bottom 33a of the lower case 33. Each of the second protrusions 43 has a flat bottom 43a and a projection 44 formed integrally with the flat bottom 43a.

The telephone set 31 includes hanging portions (not shown), which are used when the telephone set 31 is hung on a wall. The hanging portions are integrally formed on the bottom 33a of the lower case 33 between the first protrusions 41 and 41 and between the second protrusions 43 and 43, respectively. Each of the first protrusions 41 has a groove (not shown) formed at an end portion in the direction C for supporting axes of an arm 52, which will be described later.

The lower case 33 has first projecting pieces (not shown) integrally formed on the bottom 33a between the first protrusions 41 and the second protrusions 43. The first projecting pieces have an arcuate cross-section. Further, the second protrusions 43 have second projecting pieces integrally formed on ends of the second protrusions 43 in the direction C so as to correspond to the first projecting pieces. The second projecting pieces have an arcuate cross-section. The first projecting pieces and the second projecting pieces form axis receiving portions 49 for rotatably supporting an axis 62 of a stand 60, which will be described later. As shown in FIG. 1A, the lower case 33 has a hook 50 integrally formed near an end of the bottom 33a in the direction D. The hook 50 can be elastically deformed so as to engage with an engagement end 57 of the arm 52.

The arm 52 is made of plastic. The arm 52 is substantially in the form of a rectangle elongated in a direction C-D. The arm 52 has a base end portion 52a located at an end of the arm 52 in the direction C. The arm 52 also has a pair of small axes 53 and 53 projecting in opposite directions from both ends of the base end portion 52a. The arm 52 has holes 64 and 55 formed therein. Each of the holes 54 and 55 has a rectangular shape in a plan view. When the arm 52 is brought into contact with the bottom 33a of the lower case 33, the hanging portions are inserted into the holes 54 and 55 of the arm 52.

The arm 52 has a groove 56 formed near the center in the direction C-D. The groove 56 extends in the direction A-B and has an arcuate cross-section. When the arm 52 is brought into contact with the bottom 33a of the lower case 33, an axis 62 of the stand 60, which will be described later, is received into the groove 56. The arm 52 has a free end 52b located at an end of the arm 52 in the direction D. The engagement end 57 is provided on the free end 52b. When the engagement end 57 is brought into engagement with the hook 50 of the lower case 33, the arm 52 is held in contact with the bottom 33a of the lower case 33.

The arm 52 has a pair of first engagement portions 58 and a pair of second engagement portions 59 provided between the engagement end 57 and the groove 56. The first engagement portions 58 are arranged in a width direction (direction A-B), and the second engagement portions 59 are also arranged in the width direction (direction A-B). As shown in FIGS. 2A and 2B, the first engagement portions 58 and the second engagement portions 59 have an arcuate cross-section to receive a stay 63 of the stand 60.

The small axes 53 provided on the base end portion 52a are fitted into the grooves of the first protrusions 41 so that the arm 52 can be rotated about the small axes 53 of the base end portion 52a. Thus, the arm 52 is rotatably supported by the first protrusions 41 so that the free end 52b can be brought into contact with and away from the bottom 33a of the lower case 33. When the free end 52b of the arm 52 is brought into contact with the bottom 33a of the lower case 33, as shown in FIG. 1A, the engagement end 57 engages with the hook 50 of the lower case 33 to hold the arm 52 in place.

The stand 60 has a pair of supports 61 and 61 spaced in the width direction (direction A-B), an axis 62 connecting between base end portions 61a of the supports 61, and a stay 63 connecting between free ends 61b of the supports 61. The stay 63 is in parallel to the axis 62. Thus, the stand 60 is substantially in the form of a frame. The axis 62 is rotatably supported by the axis receiving portions 49 provided on the bottom 33a of the lower case 33. The stay 63 engages selectively with the first engagement portions 58 or the second engagement portion 59. The stand 60 includes non-slip pads 64 made of rubber. The non-slip pads 64 are attached to tips of the free ends 61b of the supports 61.

In the stand 60 thus constructed, the axis 62 is rotatably supported by the axis receiving portions 49 of the lower case 33 so that the free ends 61b can be brought into contact with and away from the bottom 33a of the lower case 33. When the free ends 61b of the stand 60 are brought into contact with the bottom 33a of the lower case 33, the arm 52 is positioned inside of the stand 60 in the width direction (direction A-B).

When the telephone set 31 thus constructed is used in a state in which the telephone set 31 is hung on a wall, the free ends 61b of the stand 60 are brought into contact with the bottom 33a of the lower case 33 while the free end 52b of the arm 52 is brought into contact with the bottom 33a of the lower case 33. As shown in FIG. 1A, the engagement end 57 of the arm 52 engages with the hook 50 of the lower case 33 so that the free end 52b is held in contact with the bottom 33a of the lower case 33. Simultaneously, the stay 63 of the stand 60 is held by the arm 52. Accordingly, the free ends 61b of the stand 60 are also held in contact with the bottom 33a of the lower case 33. Thus, the arm 52 and the stand 60 are folded and held on the lower case 33.

In this state, the stand 60 and the arm 52 are located near the lower case 33 from the bottoms 41a and 43a of the first and second protrusions 41 and 43. Accordingly, the projections 42 and 44 of the first and second protrusions 41 and 43 are brought into contact with a wall 66 as an installation surface. Specifically, the projections 42 and 44 of the first and second protrusions 41 and 43 serve as attachment portions to the wall 66. Thus, the telephone set 31 can be used in a wall-hung position without detaching the stand 60 and the arm 52 from the bottom 33a of the lower case 33. As a result, usability of the telephone set 31 can be improved. Since the stand 60 and the arm 52 remain attached to the bottom 33a of the lower case 33, the stand 60 and the arm 52 are prevented from being lost.

The use of the telephone set 31 on a desk will be described below with reference to FIGS. 2A and 2B.

First, the engagement end 57 of the arm 52 is disengaged with the hook 50 of the lower case 33. Then, as shown in FIG. 2A, the free end 52b of the arm 52 is rotated clockwise about the small axes 53. Rotation of the arm 52 allows the stay 63 held by the arm 52 to be released from the arm 52. Accordingly, the free ends 61b of the supports 61 can be rotated about the axis 62 of the stand 60. Then, the free ends 61b of the supports 61 are rotated clockwise about the axis 62 so that the stay 63 engages with the first engagement portions 58 of the arm 52. Thus, the telephone set 31 is set to have an installation angle α.

At that time, the free ends 61b of the supports 61 project from the arm 52 toward a desk 65 as an installation surface. Accordingly, the non-slip pads 64 are brought into contact with the desk 65, and the rubber members 40 are brought into contact with the desk 65. Specifically, the rubber members 40 and the non-slip pads 64 serve as attachment portions to the desk 65. In this manner, the telephone set 31 is supported by the rubber members 40 and the non-slip pads 64. Thus, the telephone set 31 is supported on the desk 65 with point contact or line contact. Accordingly, the entire stand 60 is not required to have a flat shape with accuracy. As a result, it is possible to reduce manufacturing cost of the telephone set 31.

The rubber members 40 attached to the bottom 33a of the telephone set 31 are used to support the telephone set 31. Specifically, the telephone set 31 is supported by the rubber members 40 and the non-slip pads 64 of the stand 60. Accordingly, the telephone set 31 does not require a base member having substantially the same shape as the bottom of the frame case. Therefore, the size of the telephone set 31 is prevented from being increased. Further, since the arm 52 is provided inside of the stand 60 in the width direction, the width of the arm 52 can be minimized. Additionally, the stay 63 serving as an engagement portion also serves as a reinforcement member for reinforcing the supports 61, and the stand 60 is in the form of a frame. Accordingly, it is possible to minimize a space in which the stand 60 occupies on the bottom 33a of the lower case 33. Therefore, it is possible to provide the first and second protrusions 41 and 43 and the hanging portions, which are needed when the telephone set 31 is hung on a wall, on the bottom 33a of the lower case 33. Thus, the telephone set 31 can be hung on a wall and can also be disposed on a desk.

When the installation angle α of the telephone set 31 is to be changed, the stay 63 of the stand 60 is disengaged with the first engagement portions 58 of the arm 52. Then, as shown in FIG. 2B, the stand 60 is rotated clockwise about the axis 62 so that the stay 63 engages with the second engagement portions 59. Thus, the installation angle of the telephone set 31 is changed into β. In this case, the rubber members 40 of the lower case 33 and the non-slip pads 64 of the stand 60 are also brought into contact with the desk 65. Specifically, the rubber members 40 and the non-slip pads 64 serve as attachment portions to the desk 65.

The aforementioned angle setting structure in the telephone set 31 has the following drawbacks.

(1) The arm 52, which forms an angle adjustment mechanism of the telephone set 31, has a large length and a complicated structure.

(2) The telephone set 31 becomes expensive for the reason (1).

(3) It is troublesome to attach the arm 52 and the stand 60 to the lower case 33 and detach the arm 52 and the stand 60 from the lower case 33. Accordingly, assembling and disassembling of the angle adjustment mechanism of the telephone set 31 cannot be conducted with ease.

SUMMARY OF THE INVENTION

The present invention has been made in view of the above drawbacks. It is, therefore, an object of the present invention to provide an improvement of the aforementioned conventional angle setting structure in an electronic device. Specifically, an object of the present invention is to provide an angle adjustment apparatus for an electronic device which can be inexpensively formed by a compact and simple structure and can readily be assembled and disassembled.

In order to attain the above object, according to an aspect of the present invention, there is provided an angle adjustment apparatus for an electronic device which can be inexpensively formed by a compact and simple structure and can readily be assembled and disassembled. The angle adjustment apparatus has a base having an engagement portion and a first projection, a leg support rotatably attached to the base, and an auxiliary plate rotatably attached to the leg support. The leg support can be selectively in a parallel position in which the leg support is substantially in parallel to the base, a first inclination position in which the leg support is inclined at a first angle with respect to the base, and a second inclination position in which the leg support is inclined at a second angle with respect to the base. The auxiliary plate is brought into abutment against the engagement portion of the base to prevent rotation of the leg support so as to hold the first inclination position of the leg support when the auxiliary plate is raised with respect to the leg support. The auxiliary plate is brought into abutment against the first projection of the base to prevent rotation of the leg support so as to hold the second inclination position of the leg support when the auxiliary plate is substantially in parallel to the leg support.

According to the present invention, the following advantageous effects can be obtained.

(1) The angle adjustment apparatus for an electronic device includes a base, a leg support rotatably attached to the base, and an auxiliary plate rotatably attached to the leg support. Accordingly, the angle adjustment apparatus can inexpensively be formed by a compact and simple structure. Further, the angle adjustment apparatus can readily be assembled and disassembled.

(2) Since the angle adjustment apparatus can have pairs of leg supports and auxiliary plates, the structure of the angle adjustment apparatus can be strengthened.

(3) The base has an engagement portion, first and second projections, and a rotation stopper which can be brought into contact with the auxiliary plate. Accordingly, the electronic device can stably be held in two positions of the large inclination position and the small inclination position.

(4) The click portion of the leg support can get over the first and second projections. An operator can feel a resistance on his/her fingers and hear a clicking sound when the electronic device is moved into the two positions.

(5) The leg support can be detached from the base only when the leg support is substantially in parallel to the base. Accordingly, detachment of the leg support can be performed safely.

(6) Conventional telephones are designed with a wedge shape which provides a slight incline in the desk position. These telephones typically require the installation of an apparatus to provide an acceptable viewing angle when in the wall mount position. The wall mount apparatus may be a removal part of the base or an optional accessory. The invention of the reverse wedge design provides the following distinct advantages over previous designs for wall mounting applications.

(6-1) Improved viewing angle: Provides a preferred upward-facing viewing angle.

(6-2) Very low profile: Other wall mount mechanisms add to the base depth.

(6-3) Does not require the repositioning, installation, or removal of any base components or optional brackets: Removable base components may be lost when not used in either the desk or wall mount position. Optional brackets may not be available at time of installation.

The above and other objects, features, and advantages of the present invention will be apparent from the following description when taken in conjunction with the accompanying drawings which illustrate preferred embodiments of the present invention by way of example.

BRIEF DESCRIPTION OF THE DRAWINGS

FIG. 3A is a rear view showing a base of an angle adjustment apparatus according to an embodiment of the present invention;

FIG. 3B is a left-side view of the base shown in FIG. 3A;

FIG. 3C is a cross-sectional view taken along line Y-Y in FIG. 3A;

FIG. 3D is a rear view showing an auxiliary plate of the angle adjustment apparatus;

FIG. 3E is a left-side view of the auxiliary plate shown in FIG. 3D;

FIG. 3F is a cross-sectional view taken along line Y-Y in FIG. 3D;

FIG. 3G is a rear view showing a leg of the angle adjustment apparatus;

FIG. 3H is a left-side view of the leg shown in FIG. 3G;

FIG. 3I is a cross-sectional view taken along line Y-Y in FIG. 3G;

FIG. 4A is a cross-sectional view taken along line Y-Y in FIGS. 3A, 3D, and 3G when the leg is being rotated with respect to the base;

FIG. 4B is an enlarged view of an encircled portion in FIG. 4A;

FIG. 4C is a cross-sectional view taken along line Y-Y in FIGS. 3D and 3G when the leg is rotated until supports of the leg are substantially in parallel to the base;

FIG. 4D is an enlarged view of an encircled portion in FIG. 4C;

FIG. 5A is a side view showing three positions of the telephone set;

FIG. 5B is a cross-sectional view taken along line Y-Y in FIGS. 3A, 3D, and 3G when the telephone set is in a small inclination position;

FIG. 5C is a cross-sectional view taken along line Y-Y in FIGS. 3A, 3D, and 3G when the telephone set is in a large inclination position;

FIG. 5D is an enlarged view of an encircled portion in FIG. 5B;

FIG. 5E is an enlarged view of an encircled portion in FIG. 5C;

FIG. 5F is a cross-sectional view taken along line Y-Y in FIGS. 3A, 3D, and 3G when the telephone set is in a wall-hung position;

FIG. 5G is an enlarged view of an encircled portion in FIG. 5F;

FIG. 7A is a perspective view of the base as seen from a rear side;

FIG. 7B is a perspective view of the leg and the auxiliary plates as seen from the rear side;

FIG. 7C is a perspective view of the leg and the auxiliary plates as seen from a front side;

FIG. 8A is a perspective view of the telephone set in which the leg is set to be substantially in parallel to the base as seen from the rear side;

FIG. 8B is a side view of the telephone set when the leg is set to be substantially in parallel to the base; and FIG. 8C is a side view of the telephone set in the small inclination position.

DETAILED DESCRIPTION OF THE PREFERRED EMBODIMENTS

Figure 1A:
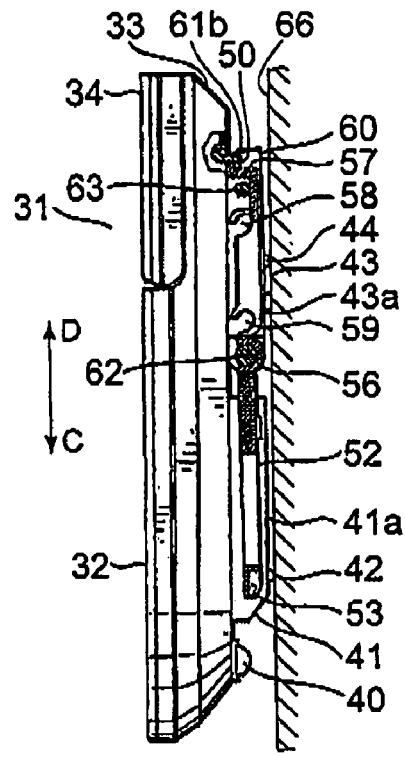
FIG. 1A is a side view showing a conventional telephone set in a wall-hung position.
Figure 1B:
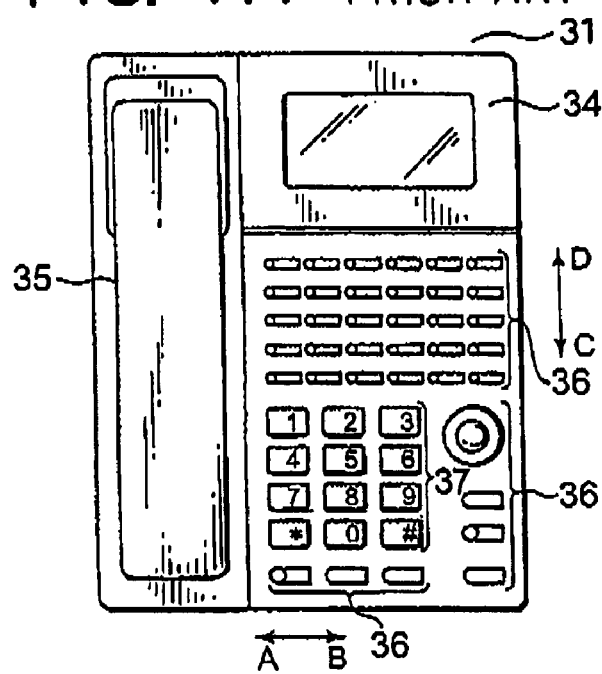
FIG. 1B is a plan view of the conventional telephone set shown in FIG. 1A.
Figure 2A:
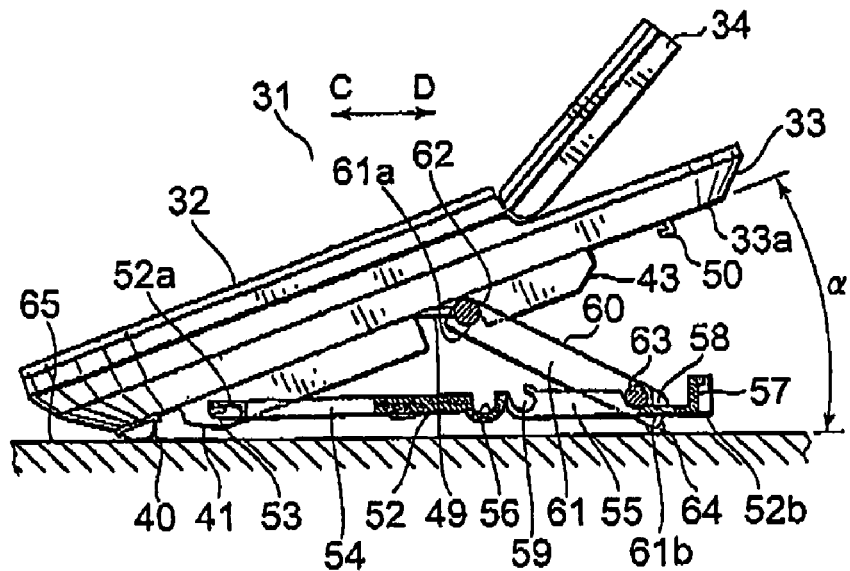
FIG. 2A is a side view of the conventional telephone set in a small inclination position.
Figure 2B:
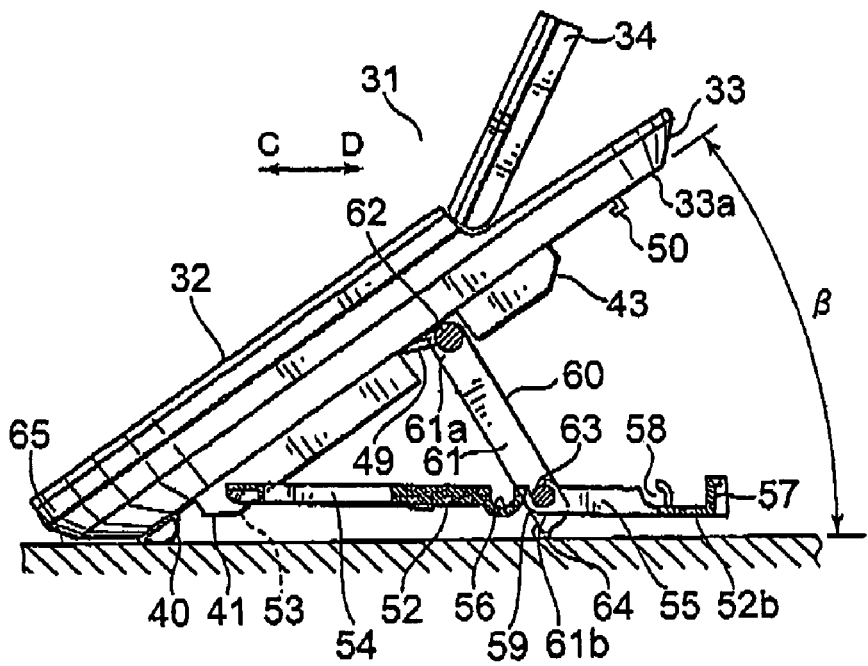
FIG. 2B is a side view of the conventional telephone set in a large inclination position.

An angle adjustment apparatus according to an embodiment of the present invention will be described below with reference to FIGS. 3A through 8C. Like or corresponding parts are denoted by like or corresponding reference numerals throughout drawings and will not be described below repetitively. In the following embodiment, a telephone set is described as an example of an electronic device having an angle adjustment apparatus. However, an electronic device is not limited to a telephone set.

FIGS. 3A through 3I are various views showing a telephone set with an angle adjustment apparatus according to an embodiment of the present invention. The angle adjustment apparatus includes a base 1, a leg 2, and a pair of auxiliary plates 3. The auxiliary plates 3 are attached to the leg 2 so as to rotate through 90°. FIGS. 3A through 3C show the base 1. FIGS. 3D through 3F show one of the auxiliary plates 3. FIGS. 3G through 3I show the leg 2.

The base 1 is made of synthetic resin. The base 1 has a rear surface on which various structures are integrally formed. The base 1 includes recesses 1a formed in the rear surface thereof along Y-Y axes located on the right and left sides of FIG. 3A. Each of the recesses 1a receives the leg 2. Further, the base 1 includes non-slip rubber members 1b provided on the rear surface of the base 1 at a lower portion on the right and left sides of the base 1 of FIG. 3A. Further, a pair of axes 1c extend from inner surfaces of each recess 1a.

The leg 2 includes a pair of supports 2a and a connector 2b interconnecting the supports 2a. The supports 2a are disposed on both sides of the connector 2b. Each of the supports 2a has holes 2a1 for receiving the axes 1c and guide recesses 2a2 (see FIGS. 8A and 8B). The holes 2a1 and the guide recesses 2a2 are formed in both side walls at a tip of the support 2a. The axes 1c of the base 1 are inserted into the holes 2a1 of the supports 2a. Further, each of the supports 2a has axes 2a3 projecting near the holes 2a1.

Each of the auxiliary plates 3 has holes 3a formed in both side walls. The axes 2a3 of the supports 2a are inserted into the holes 3a of the auxiliary plates 3.

FIG. 4A is a cross-sectional view taken along line Y-Y in FIGS. 3A, 3D, and 3G when the leg 2 is being rotated with respect to the base 1. FIG. 4B is an enlarged view of an encircled portion in FIG. 4A. As shown in FIG. 4B, each of the supports 2a of the leg 2 has a click portion 2a4 provided at a tip of the support 2a. The base 1 has first projections 1e1 and second projections 1e2 provided on a sheet portion 1d, which can be elastically deformed. Since the projections 1e1 and 1e2 are provided on right and left sides of the base 1, the base 1 has four projections in total. When the click portion 2a4 gets over the first projection 1e1 and over the second projection 1e2, an operator feels a resistance on his/her fingers and hears a clicking sound.

FIG. 4C is a cross-sectional view taken along line Y-Y in FIGS. 3D and 3G when the leg 2 is rotated until the supports 2a of the leg 2 are substantially in parallel to the base 1. FIG. 4D is an enlarged view of an encircled portion in FIG. 4C.

FIGS. 5A through 5G show various positions of the telephone set. FIG. 5A is a side view showing three positions of the telephone set which include a small inclination position in which the telephone set is inclined at a small angle, a large inclination position in which the telephone set is inclined at a large angle, and a wall-hung position in which the telephone set is hung on a wall. FIGS. 5B and 5C are cross-sectional views taken along line Y-Y in FIGS. 3A, 3D, and 3G when the telephone set is in the small inclination position and in the large inclination position, respectively. FIGS. 5D and 5E are enlarged views of encircled portions in FIGS. 5B and 5C, respectively. FIG. 5F is a cross-sectional view taken along line Y-Y in FIGS. 3A, 3D, and 3G when the telephone set is in the wall-hung position. FIG. 5G is an enlarged view of an encircled portion in FIG. 5F.

When the telephone set is in the small inclination position, as shown in FIG. 5D, the auxiliary plates 3 are substantially in parallel to the supports 2a, respectively. The tips of the auxiliary plates 3 are brought into abutment against a right surface of the first projections 1e1. The click portions 2a4 of the supports 2a are brought into abutment against a left surface of the second projections 1e2. Accordingly, the supports 2a cannot be further rotated counterclockwise with respect to the base 1. At that time, the auxiliary plates 3 are brought into abutment against rotation stoppers 1f of the sheet portions 1d. Therefore, the auxiliary plates 3 are reliably prevented from being raised (rotated clockwise).

When the telephone set is in the large inclination position, as shown in FIG. 5E, the auxiliary plates 3 are perpendicular to the supports 2a. The tips of the auxiliary plates 3 are brought into abutment against the engagement portions 1g of the base 1. The click portions 2a4 of the supports 2a are located between the first projections 1e1 and the second projections 1e2. Accordingly, the supports 2a cannot be further rotated counterclockwise with respect to the base 1.

The positions of the auxiliary plates 3 are adjusted by fingers of an operator so that the auxiliary plates 3 are substantially in parallel to the supports 2a of the leg 2 or in perpendicular to the supports 2a (in a raised state).

When the telephone set is in the wall-hung position, as shown in FIG. 5G, the auxiliary plates 3 are substantially in parallel to the supports 2a, The tips of the auxiliary plates 3 or the click portions 2a4 of the supports 2a are not brought into abutment against any portion of the base 1. At that time, as shown in FIG. 5F, the supports 2a are substantially in parallel to the base 1.

Figure 6A:
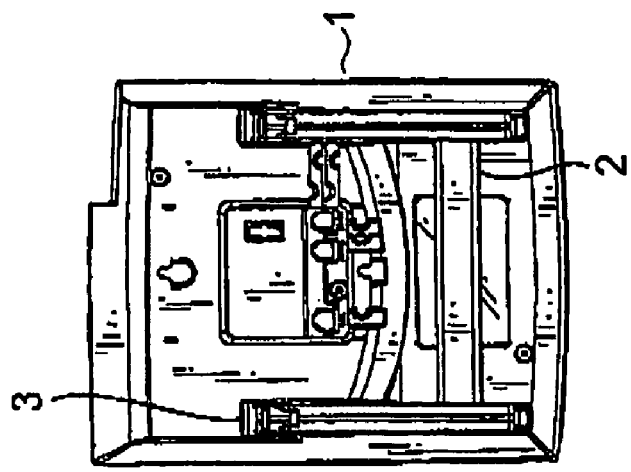
FIG. 6A is a rear view of the telephone set in the small inclination position.
Figure 6B:
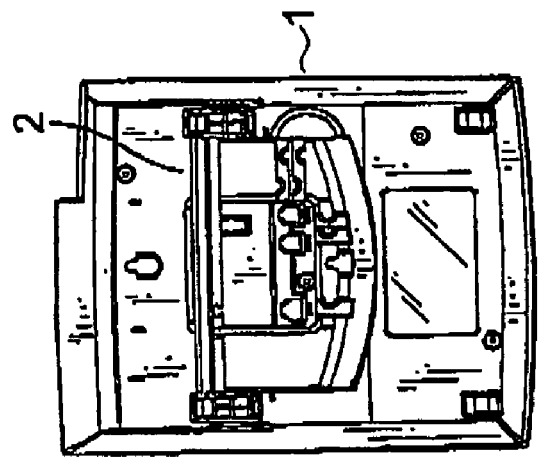
FIG. 6B is a rear view of the telephone set in the large inclination position.
Figure 6C:
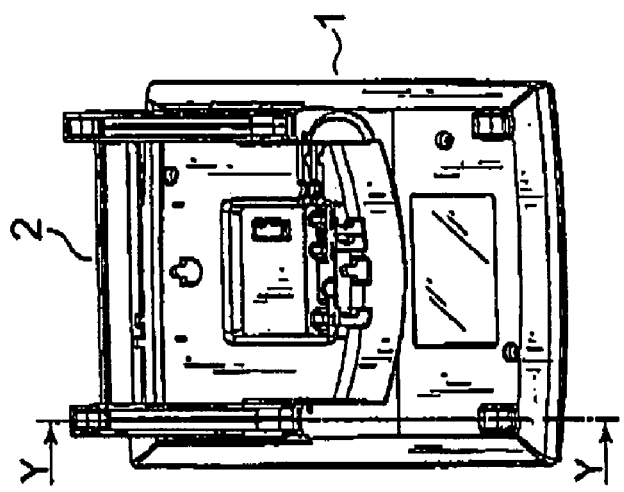
FIG. 6C is a rear view of the telephone set in the wall-hung position.

FIGS. 6A through 6C are rear views showing various positions of the base 1, the leg 2, and the auxiliary plates 3. Specifically, FIGS. 6A through 6C show the small inclination position, the large inclination position, the wall-hung position of the base 1, the leg 2, and the auxiliary plates 3, respectively.

FIGS. 7A through 7C are perspective views of the base 1, the leg 2, and the auxiliary plates 3. FIG. 7A is a perspective view of the base 1 as seen from a rear side. FIG. 7B is a perspective view of the leg 2 and the auxiliary plates 3 as seen from the rear side. FIG. 7C is a perspective view of the leg 2 and the auxiliary plates 3 as seen from a front side.

Attachment of the leg 2 to the base 1 will be described. As shown in FIG. 7C, each of the supports 2a of the leg 2 is formed so as to have a width smaller than a width of each recess 1a formed in the base 1. As shown in FIGS. 7A and 7B (and also 8B), the tips of the supports 2a of the leg 2 are pushed into the recesses 1a of the base 1 in a direction indicated by arrows and thus inserted into the recesses 1a by fingers of an operator. The axes 1c of the base 1 are guided by the guide recesses 2a2 on the supports 2a of the leg 2. Then, the axes 1c are inserted into the holes 2a1 in the supports 2a. At that time, the base 1 and the leg 2 are elastically deformed to some extent because the base 1 and the leg 2 are made of synthetic resin.

FIGS. 8A through 8C are various views showing the telephone set to explain a position at which the leg 2 can be attached to and detached from the base 1 and a range in which the leg 2 cannot be attached to and detached from the base 1. The position at which the leg 2 can be attached to and detached from the base 1 and the range in which the leg 2 cannot be attached to and detached from the base 1 will be described below with reference to FIGS. 8A through 8C.

As shown in FIG. 8B, when the supports 2a are substantially in parallel to a rear surface of the base 1, the supports 2a (the leg 2) can be attached to and detached from the base 1. However, the supports 2a cannot be attached to and detached from the base 1 in a range from a position at which the supports 2a are inclined at a small angle (see FIG. 8C) to a position at which the supports 2a are inclined at a large angle with respect to the base 1. Capability of attachment and detachment of the supports 2a depends upon whether or not the guide recesses 2a2 of the supports 2a can pass the axes 1c of the base 1.

In the present embodiment, the telephone set has a pair of supports 2a in the leg 2 and a pair of auxiliary plates 3 and thus has a strong structure. However, the telephone set may have only one auxiliary plate 3 and only one support 2a without the connector 2b.

Although certain preferred embodiments of the present invention have been shown and described in detail, it should be understood that various changes and modifications may be made therein without departing from the scope of the appended claims.

What is claimed is:

1. An angle adjustment apparatus for an electronic device, said angle adjustment apparatus comprising:

a base having an engagement portion and a first projection;

a leg support rotatably attached to said base, said leg support being capable of being selectively in a parallel position in which said leg support is substantially in parallel to said base, a first inclination position in which said leg support is inclined at a first angle with respect to said base, and a second inclination position in which said leg support is inclined at a second angle with respect to said base;

an auxiliary plate rotatably attached to said leg support, said auxiliary plate being brought into abutment against said engagement portion of said base to prevent rotation of said leg support so as to hold said first inclination position of said leg support when said auxiliary plate is raised with respect to said leg support and brought into abutment against said first projection of said base to prevent rotation of said leg support so as to hold said second inclination position of said leg support when said auxiliary plate is substantially in parallel to said leg support; and a click portion disposed on said leg support, said click portion indicating when said auxiliary plate is brought into abutment against said engagement portion of said base and when said auxiliary plate is brought into abutment against said first projection of said base.

2. The angle adjustment apparatus as recited in claim 1, further comprising another set of said base, said leg support, and said auxiliary plate.

3. The angle adjustment apparatus as recited in claim 1, wherein said base has a rotation stopper formed between said engagement portion and said first projection for stopping rotation of said auxiliary plate.

4. The angle adjustment apparatus as recited in claim 1, wherein said click portion is formed at a tip of said leg support, wherein said base has a second projection, wherein said click portion gets over said first projection when said auxiliary plate is brought into abutment against said engagement portion of said base and gets over said second projection when said auxiliary plate is brought into abutment against said first projection of said base.

5. The angle adjustment apparatus as recited in claim 1, wherein said base has a recess and a pair of axes projecting on surfaces of said recess so as to face each other, wherein said leg support has a pair of holes for receiving said pair of axes of said base so that said leg support is attached to said base.

6. The angle adjustment apparatus as recited in claim 5, wherein said leg support has a pair of guide recesses formed so as to guide said pair of axes of said base into said pair of holes when said leg support is substantially in parallel to said base.

* * * * *